(12) United States Patent
Geaghan

(10) Patent No.: US 7,973,771 B2
(45) Date of Patent: Jul. 5, 2011

(54) TOUCH SENSOR WITH ELECTRODE ARRAY

(75) Inventor: Bernard O. Geaghan, Salem, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 1118 days.

(21) Appl. No.: 11/734,553

(22) Filed: Apr. 12, 2007

(65) Prior Publication Data
US 2008/0252608 A1 Oct. 16, 2008

Related U.S. Application Data

(63) Continuation-in-part of application No. 11/612,799, filed on Dec. 19, 2006, now abandoned.

(51) Int. Cl.
G06F 3/041 (2006.01)

(52) U.S. Cl. ........................................................ 345/173

(58) Field of Classification Search .................. 345/173
See application file for complete search history.

(56) References Cited

U.S. PATENT DOCUMENTS

| 4,293,734 | A | 10/1981 | Pepper, Jr. | |
|---|---|---|---|---|
| 4,353,552 | A | 10/1982 | Pepper, Jr. | |
| 4,371,746 | A | 2/1983 | Pepper, Jr. | |
| 4,622,437 | A | 11/1986 | Bloom et al. | |
| 4,686,332 | A | 8/1987 | Greanias | |
| 4,731,508 | A | 3/1988 | Gibson et al. | |
| 4,797,514 | A | 1/1989 | Talmage, Jr. et al. | |
| 5,045,644 | A | 9/1991 | Dunthorn | |
| 5,305,017 | A | 4/1994 | Gerpheide | |
| 5,374,787 | A | 12/1994 | Miller | |
| 5,730,165 | A | 3/1998 | Philipp | |
| 5,790,106 | A | 8/1998 | Hirano | |
| 6,137,427 | A | 10/2000 | Binstead | |
| 6,177,918 | B1 | 1/2001 | Colgan et al. | |
| 6,392,636 | B1 | 5/2002 | Ferrari et al. | |
| 6,466,036 | B1 | 10/2002 | Philipp | |
| 6,549,193 | B1* | 4/2003 | Huang et al. | 345/173 |
| 6,559,835 | B1* | 5/2003 | Randall | 345/173 |
| 6,593,916 | B1 | 7/2003 | Aroyan | |
| 6,943,705 | B1* | 9/2005 | Bolender et al. | 341/33 |
| 6,970,160 | B2 | 11/2005 | Mulligan et al. | |
| 2001/0022352 | A1 | 9/2001 | Rudrich | |
| 2002/0101410 | A1 | 8/2002 | Sakata et al. | |
| 2003/0132922 | A1 | 7/2003 | Philipp | |
| 2005/0052429 | A1* | 3/2005 | Philipp | 345/173 |
| 2006/0016800 | A1 | 1/2006 | Paradiso | |
| 2006/0022959 | A1 | 2/2006 | Geaghan | |
| 2007/0257894 | A1* | 11/2007 | Philipp | 345/173 |

FOREIGN PATENT DOCUMENTS

| EP | 1 172 831 | 1/2002 |
|---|---|---|
| JP | 16-280720 A | 10/2004 |

* cited by examiner

Primary Examiner — Amare Mengistu
Assistant Examiner — Jennifer Zubajlo
(74) Attorney, Agent, or Firm — Steven A. Bern

(57) ABSTRACT

A touch sensor is provided that includes an array of discrete electrodes disposed over a touch sensitive area, the electrodes being elongated in a first direction and having a variable width measured in a second direction that is perpendicular to the first direction. A touch location can be determined by simultaneously applying an electrical signal to a plurality of positions on the touch sensor, the touch location along the first direction being determined by comparing a capacitive coupling between the touch implement and the plurality of positions in the touch sensor, and the touch location along the second direction being determined by comparing a resistive coupling between the touch implement and the plurality of positions in the touch sensor.

22 Claims, 7 Drawing Sheets

TOUCH SENSOR WITH ELECTRODE ARRAY

CROSS REFERENCE TO RELATED APPLICATIONS

This application is a continuation-in-part of U.S. application Ser. No. 11/612,799, filed Dec. 19, 2006 now abandoned.

This invention generally relates to touch sensors. The invention is particularly applicable to capacitive touch sensors where the touch sensitive area includes an array of resistive electrodes.

BACKGROUND

Touch screens allow a user to conveniently interface with an electronic display system by reducing or eliminating the need for a keyboard. For example, a user can carry out a complicated sequence of instructions by simply touching the screen at a location identified by a pre-programmed icon. The on-screen menu may be changed by re-programming the supporting software according to the application. As another example, a touch screen may allow a user to transfer text or drawing to an electronic display device by directly writing or drawing onto the touch screen.

Resistive and capacitive are two common touch sensing methods employed to detect the location of a touch input. Resistive technology typically incorporates two transparent conductive films as part of an electronic circuit that detects the location of a touch. Capacitive technology, on the other hand, typically uses a single transparent conductive film to detect the location of an applied touch.

Some known capacitive touch sensors include an electrically continuous resistive layer disposed in the touch sensitive area. An example of such a sensor is discussed in U.S. Pat. No. 5,045,644 where orthogonal electric fields are produced on a resistive surface to determine a touch location. Some other known capacitive touch sensors employ an array of electrically conductive electrodes disposed in the touch sensitive area discussed in, for example, U.S. Pat. No. 6,970,160.

SUMMARY

The present disclosure provides capacitive touch sensors that include a plurality of discrete elongated electrically resistive electrodes disposed in a touch sensitive area. Each discrete electrode has a length along a first direction and a width along a second direction orthogonal to the first direction, the width of each elongated electrode varying along the first direction. When a touch implement is applied to a touch location in the touch sensitive area, the touch location is determined by simultaneously applying an electrical signal to a plurality of positions on the touch sensor, the touch location along the first direction being determined by comparing a capacitive coupling between the touch implement and the plurality of positions on the touch sensor, and the touch location along the second direction being determined by comparing a resistive coupling between the touch implement and the plurality of positions on the touch sensor.

The present disclosure also provides capacitive touch sensors that include a plurality of discrete electrodes disposed in an electrode array within a touch sensitive area, and in which the touch location of a touch implement is determined when a plurality of positions along the periphery of the electrode array are electrically energized. The sensor is configured such that the ratio of capacitive coupling between the touch implement and a first pair of positions in the plurality of positions changes when the touch location is changed along a first direction but the same ratio remains substantially unchanged when the touch location is changed along an orthogonal direction.

The present disclosure further provides capacitive touch sensors that include a plurality of triangular electrodes disposed in an electrode array in a touch sensitive area, each triangular electrode having two sides connecting a tip to a base, a side of each triangular electrode facing and being substantially parallel to a side of an adjacent triangular electrode. First and second pluralities of the bases of the triangular electrodes are electrically connected to first and second pluralities of positions along a periphery of the electrode array, respectively. When a touch implement is applied to a touch location in the touch sensitive area, the touch location is determined by electrically energizing first and second pluralities of positions and comparing the signals generated by capacitive and resistive coupling between the touch implement and the first and second pluralities of positions.

The present disclosure also provides capacitive touch sensor arrays that include a first plurality of triangular electrodes interdigitated with a second plurality of triangular electrodes, and a third plurality of triangular electrodes. The electrodes in the first and second plurality are elongated in a first direction and disposed in a touch sensitive area such that a side of each triangular electrode faces and is substantially parallel to a side of an adjacent triangular electrode. The third plurality of electrodes is oriented orthogonally to the first direction and electrically connected to the first plurality of triangular electrodes through a first resistive divider. When a touch implement is applied to a touch location in the touch sensitive area, the touch location is determined by electrically energizing both ends of the first resistive divider and comparing signals generated by capacitive and resistive coupling between the touch implement and the first and second resistive dividers.

The present disclosure further provides capacitive touch sensors that include a plurality of triangular electrodes disposed in a touch sensitive area, each triangular electrode having two sides connecting a tip to a base, a side of each triangular electrode facing and being substantially parallel to a side of an adjacent triangular electrode. First and second pluralities of the bases of the triangular electrodes are electrically connected to first and second resistive dividers, respectively. A first set of two signals is applied to the first resistive divider, and a second set of two signals is applied to the tips of two triangular electrodes of the second plurality of triangular electrodes. As a result, when a touch implement is applied to a touch location in the touch sensitive area, the touch location is determined by measuring a parameter of the first set of two signals and the second set of two signals, and calculating based on the measured parameters.

The present disclosure also provides methods of calibrating capacitive touch sensing systems that include a sensor in electrical communication with controller electronics, the sensor having an electrode array that exhibits inter-electrode electrical resistance, intra-electrode electrical resistance, and distributed capacitance from each electrode to ground. The calibration methods include operating the controller electronics at a selected frequency, subjecting the sensor to multiple sample touch inputs at different locations on the sensor, measuring signals due to the sample touch inputs at a plurality of interconnect locations on the sensor, and operating the controller electronics at an adjusted frequency selected so that the difference between the largest and smallest signals for each of the sample touch inputs is sufficiently large to yield a desired resolution.

The present disclosure also provides capacitive touch sensing systems that include a sensor having one or more resistive elements defining a touch sensitive area and at least one elongated electrically resistive edge element disposed along an edge of the touch sensitive area. The system also includes controller electronics coupled to the touch sensitive area via a plurality of first interconnects and coupled to the at least one resistive edge element via at least one second interconnect, the controller electronics configured to receive signals through the first interconnects and at least one second interconnect, the received signals being proportionate to an amount of capacitively coupling of a touch input to the one or more resistive elements and the at least one edge element, the controller electronics being further configured to use ratios of signals obtained at the first interconnects to determine touch position and to use signals obtained at the at least one second interconnect to reduce errors in the touch position determination.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF DRAWINGS

The present disclosure may be more completely understood and appreciated in consideration of the following detailed description of various embodiments in connection with the accompanying drawings, in which.

Figure 1:
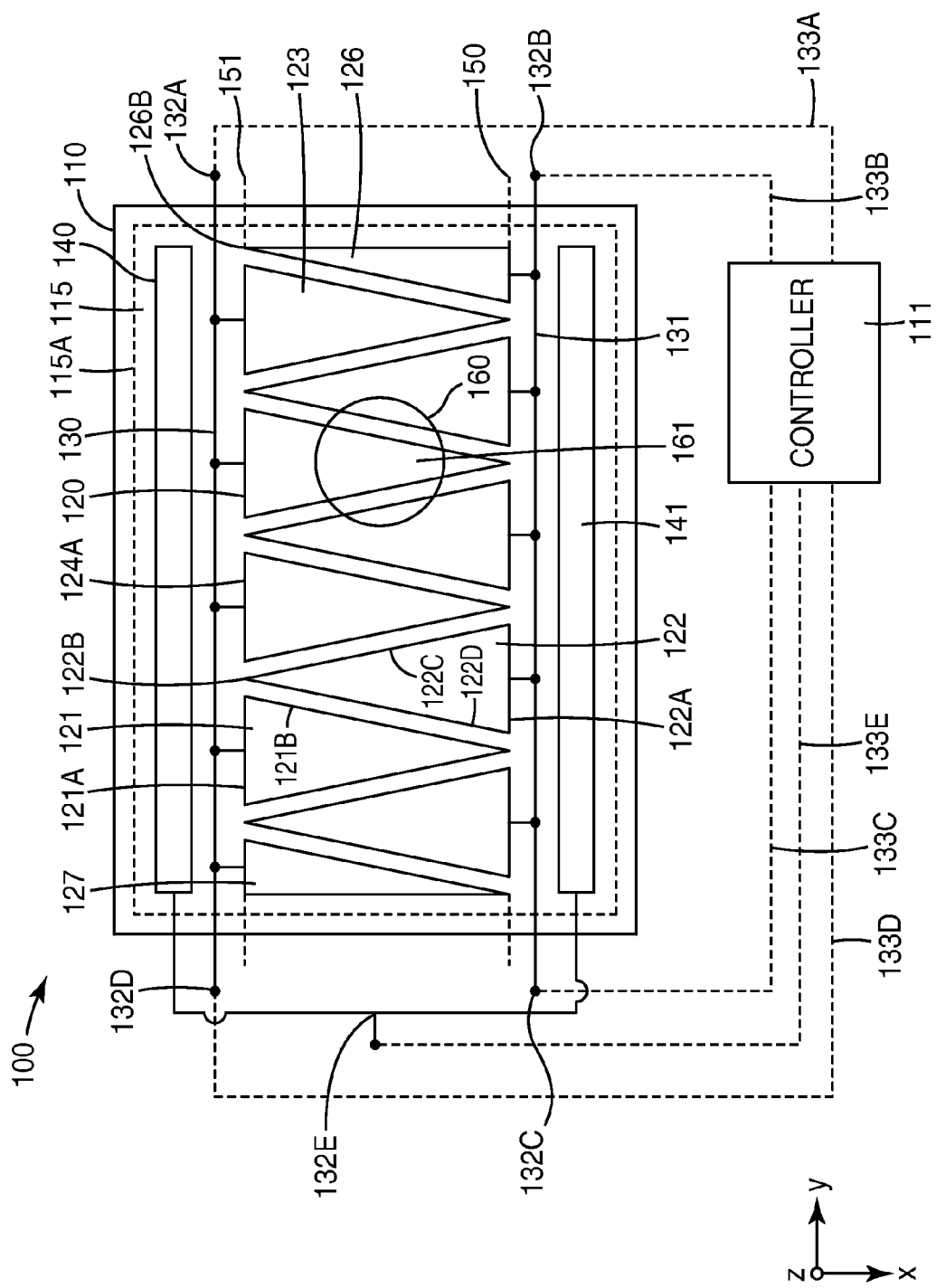
FIG. 1 is a schematic top view of a touch sensing system according to the present disclosure.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

The present disclosure generally relates to touch sensors and related electronics. The present disclosure is particularly applicable to capacitive touch sensors that include an array of electrically resistive electrodes in a touch sensitive area, for example elongated electrodes having varying widths (e.g., tapered electrodes such as those that have a triangular or wedge-shape).

While some sensors having arrays of wedge-shaped (triangular) electrodes have been proposed (see, e.g., U.S. Pat. Nos. 4,087,625; 6,297,811; 4,659,874; 4,705,919; 4,831,566; and 4,952,757), such electrodes have typically been used as discrete sensor bars, or pairs of sensor bars, which requires individual external connections to each wedge electrode.

The present disclosure provides capacitive touch sensors having resistive electrode arrays where a first electrical property is used to determine a touch position along a first direction on the array, and a second electrical property different than the first property is used to determine the touch position along a second direction on the array, for example orthogonal to the first direction. Sensors of the present disclosure can have a reduced number of external electrical connections to the touch sensitive area for determining the touch location relative to sensors having discrete connections to each of the electrodes in an array. For example, the present disclosure provides sensors that utilize only four connections to the electrode array such as one connection on each corner.

In sensor configurations of the present disclosure, the electrical resistance between any two connections can be increased while maintaining the overall touch sensor performance, such as maintaining the accuracy of determining a touch location. Increased corner-to-corner resistance can allow for less expensive electronics by allowing use of electronics with, for example, higher input impedance. Increased resistance can permit use of low cost charge transfer type controllers which tend to generate more corner-to-corner currents than more conventional controller. Examples of suitable electronics for use in sensor configurations of the present disclosure include those disclosed in U.S. Pat. No. 6,466,036 and in co-assigned U.S. patent application Ser. No. 11/612,790 entitled "Capacitance Measuring Circuit and Method," which are incorporated by reference herein, as well as electronics packages commercially available from 3M Touch Systems, Inc., under the designation SMT3. Other suitable circuits include those available in electronics packages sold by 3M Touch Systems, Inc., under the designation EXII, as well as circuits disclosed in U.S. Pat. Nos. 4,293,734 and 4,778,951, which are incorporated by reference herein.

In sensor configurations of the present disclosure, resistance between the connections can be higher than with continuous film sensors like those disclosed in U.S. Pat. No. 4,293,734, for example. Higher connection-to-connection resistance allows sufficiently accurate current ratio measurement with less complex, typically lower cost electronics that may have higher input impedance and/or poorer matching of circuit parameters and signals among the measurement circuits. In fact, in some embodiments, the resistance between certain of the connections can be infinite (see, for example, sensor 110 in FIG. 1 where the resistance is infinite between the upper I/O connections 132A/132D and the lower I/O connections 132B/132C). Having large resistances between signal line connections can be an advantage because any currents flowing between connections can cause errors. This is a particular advantage when the sensors are used with lower cost charge transfer type controllers, which can otherwise generate relatively high corner-to-corner currents than more expensive or complex controllers.

In addition to reducing errors that can be caused by corner-to-corner currents, sensors of the present disclosure can be used to reduce errors that can be caused by a touch input that occurs near unshielded interconnect lines. This can be accomplished by adding edge bar electrodes (e.g., between the interconnect traces and the electrode array) that can be used to measure proximity of the touch to the interconnects (thereby allowing touch location errors to be algorithmically compensated, for example), or by replacing interconnect lines with an electrode that is shaped to measure touch inputs and/or that is balanced by a similar opposing electrode.

These and other various aspects and embodiments will become apparent to one of skill in the art in reference to the figures and description that follows.

FIG. 1 shows a schematic top-view of a touch sensing system 100. The touch sensing system includes a touch sensor 110 and a controller 111 for electrically energizing and receiving signals from touch sensor 110. Touch sensor 110 includes a touch sensitive area 115 having a perimeter 115A. Touch sensitive area 115 includes a plurality of tapered electrodes 120 disposed therein. Electrodes 120 include one or more middle tapered electrodes, such as middle electrodes 121 and 122, disposed between two edge tapered electrodes 127 on the left and 126 on the right, respectively. Each tapered electrode has a triangular shape with two sides connecting a tip to a base. For example, triangular electrode 122 has two sides 122C and 122D connecting a tip 122B to a base 122A.

Figure 2A:
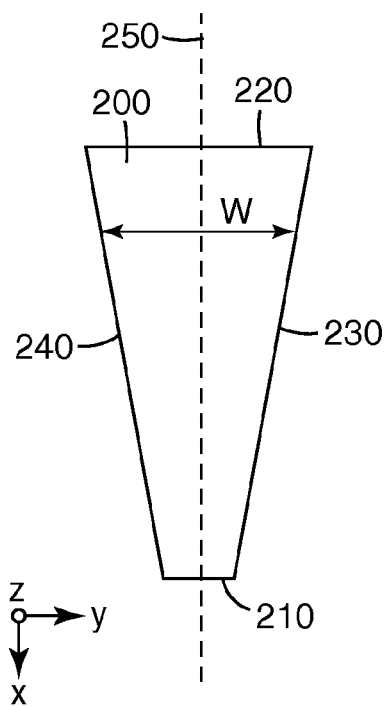
FIGS. 2A and 2B schematically show features of tapered electrodes useful in sensors according to the present disclosure.
Figure 2B:
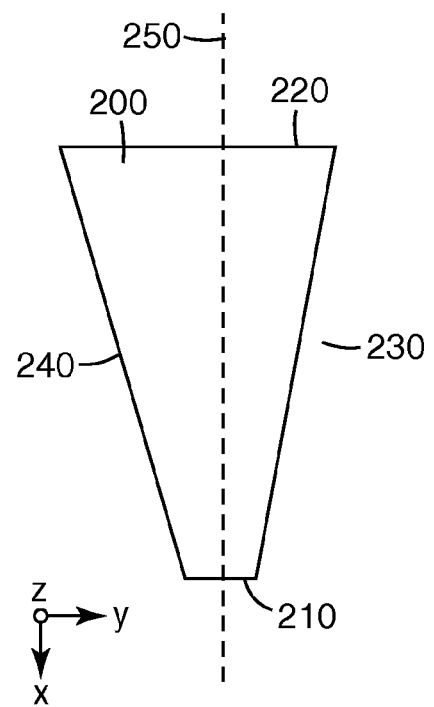

In some applications, one or more of tapered electrodes 120 may be trapezoidal as shown schematically in FIG. 2A where a tapered trapezoidal electrode 200 has sides 230 and 240 connecting a smaller base 210 to a larger base 220. Electrode 220 may be symmetric about an axis 250 as shown in FIG. 2A or may be asymmetric as shown in FIG. 2B.

In some cases, an electrode in the plurality of tapered electrodes 120 can be an elongated electrode having two ends and a width that varies linearly along the length of the electrode and between the two electrode ends. For example, electrode 200 in FIG. 2A can be elongated along the x-direction with ends 210 and 220 and a width W that varies linearly along the x-axis.

Referring back to FIG. 1, in some cases, an electrode in the plurality of tapered electrodes 120 can be an elongated electrode having a length $L_1$ and a largest width $W_1$ where the ratio $L_1/W_1$ is at least 10. In some applications, the ratio $L_1/W_1$ is at least 5. In some other applications, the ratio $L_1/W_1$ is at least 50. In some applications, the plurality of tapered electrodes 120 can form a linear array. For example, electrodes 120 in FIG. 1 form a linear array arranged along the y-axis with each electrode oriented along the x-axis. In general, the middle electrodes in plurality of electrodes 120 may or may not have the same shape and may or may not be of the same size. For example, the base of an electrode located closer to a side of touch sensitive area 115 may be smaller than the base of an electrode located closer to the center of the touch sensitive area.

In the embodiment illustrated by FIG. 1, each tapered electrode 120 tapers in opposite direction relative to its nearest neighbor tapered electrode(s). For example, adjacent middle electrodes 121 and 122 taper along positive and negative x-directions, respectively. As another example, edge electrode 126 tapers in the negative x-direction while middle electrode 123, adjacent to electrode 126, tapers in the positive x-direction. In such an arrangement, the bases of adjacent electrodes can be located along opposite edges of the touch sensitive area. For example, base 122A is located along the bottom edge of touch sensitive area 115 and base 121A is located along the top edge of touch sensitive area 115.

In some cases, a side of each triangular electrode faces and is substantially parallel to a side of an adjacent triangular electrode. For example, side 122D of electrode 122 faces and is substantially parallel to side 121B of electrode 121. In some cases, electrode bases located along an edge of touch sensitive area 115 are co-linear. For example, electrode bases located along the bottom edge of touch sensitive area 115 are co-linear with line 150 along the y-axis. As another example, electrode bases located along the top edge of touch sensitive area 115 are co-linear with line 151 along the y-axis. In such cases, a tip of a triangular electrode can be disposed in between neighboring electrode bases. Furthermore, the tip can lie on a line extending from a neighboring base. For example, tip 122B is disposed in between electrode bases 121A and 124A. Furthermore, tip 126B lies on line 151 extending from the base of electrode 123.

Bases located along the top edge of touch sensitive area 115 form a first plurality of bases and bases located along the bottom edge of the touch sensitive area form a second plurality of bases. The top bases correspond to top electrodes and are all electrically connected to a resistive divider bar 130 that terminates at upper right and left corners 132A and 132D, respectively. In some cases, the resistance of resistive divider bar 130 between corners 132A and 132D is substantially greater than the resistance of each top electrode. Similarly, the bottom bases correspond to bottom electrodes and are all electrically connected to a resistive divider bar 131 that terminates at lower right and left corners 132B and 132C, respectively. In some cases, the resistance of resistive divider bar 131 between corners 132B and 132C is substantially greater than the resistance of each bottom electrode. Resistive divider bars 130 and 131 may or may not be transparent. End-to-end resistance of a resistive divider bar can be in a range from about 100 ohms to about 100,000 ohms. In some cases, the end-to-end resistance of a resistive divider bar can be in a range from about 1,000 ohms to about 100,000 ohms. In some other cases, the end-to-end resistance of a resistive divider bar can be in a range from about 10,000 ohms to about 100,000 ohms.

Controller 111 is electrically connected to four external connections 132A-132D via I/O connections 133A-133D, respectively. Controller 111 detects the location of an input touch applied to touch sensitive area 115 by applying signals to the touch sensitive area 115 and receiving and analyzing signals generated when a touch is applied to the touch sensitive area. The sensor connections 132A-132D can be driven with identical AC signals (e.g., 3 V peak-to-peak at 100 KHz) and the currents flowing at each of the connections can be measured. The ratios of these currents can then be used to calculate position using known algorithms, for example those disclosed in U.S. Pat. No. 4,293,734, and as described in more detail below.

In some cases, a touch location 160 has a touch area 161 that covers portions of some of the upper based and lower based electrodes. As the touch location is moved up along the negative x-direction, the touch area covers more area of the upper based electrodes and less area of the lower based electrodes. The change in distribution of the area increases the capacitive coupling between the touch implement and each of top connections 132A and 132D, and reduces the capacitive coupling between the touch implement and each of bottom connections 132B and 132C. In cases where the resistance of divider bar 130 is substantially larger than the resistance of each top electrode, moving the touch location along the negative x-axis does not significantly affect the resistive coupling between the touch implement and either corner 132A or corner 132D. In such cases, upward movement primarily affects the capacitive coupling between the touch implement and each of the two top corners.

Similarly, as the touch location is moved down along the positive x-direction, the touch area covers more area of the bottom electrodes and less area of the top electrodes. The change in area increases the capacitive coupling between the touch implement and each of bottom corners 132B and 132C and reduces the capacitive coupling between the touch implement and each of top corners 132A and 132D. In cases where the resistance of divider bar 131 is substantially larger than the resistance of each bottom electrode, moving the touch location along the positive x-axis does not significantly affect the resistive coupling between the touch implement and either corner 132B or corner 132C. In such cases, downward movement primarily affects the capacitive coupling between the touch implement and each of the two bottom corners.

In some cases, when a touch implement is applied to touch location 160, the touch location along the x-direction is determined by the controller simultaneously electrically energizing the four connections 132A-132D. For example, the controller can apply an AC voltage to the four corners, where in some cases, voltages of the same phase and similar magnitude may be applied to the four corners. In such cases, the controller can detect the current flowing through each of the four corners, denoted $I_{132A}$, $I_{132B}$, $I_{132C}$, and $I_{132D}$ corresponding to four corners 132A-132D, respectively. In some cases, the ratios $I_{132D}/I_{132A}$ and $I_{132C}/I_{132B}$ remain substantially unchanged as the touch implement is moved up or down along the x-axis. In these cases, however, the ratios $I_{132D}/I_{132C}$ and $I_{132A}/I_{132B}$ can change as the touch implement is moved along the x-axis primarily due to a change in capacitive coupling between the touch implement and the left corners 132C and 132D, and 132A and 132B, respectively. The current ratios $I_{132D}/I_{132C}$ and $I_{132A}/I_{132B}$ can be used to determine touch location 160 along the x-axis.

In some cases, such as when touch area 160 covers a sufficient number of top and bottom electrodes, as touch location 160 is moved to the left or to the right along the y-direction, the touch area's coverage of top and bottom electrodes remains essentially unchanged. In cases where the resistances of divider bars 130 and 131 are substantially larger than the end-to-end resistance of each top and bottom electrode, respectively, moving touch location 160 along the y-axis can affect the resistive coupling but not the capacitive coupling between the touch implement and each of top corners 132A and 132D. In such cases, the current ratios $I_{132D}/I_{132C}$ and $I_{132A}/I_{132B}$ remain essentially unchanged as touch location 160 is moved sideways along the y-axis. The ratios $I_{132D}/I_{132A}$ and $I_{132C}/I_{132B}$ change as the touch implement is moved along the y-axis primarily due to a change in resistive coupling between the touch implement and the top corners 132A and 132D, and 132C and 132B, respectively. The current ratios $I_{132D}/I_{132A}$ and $I_{132C}/I_{132B}$ can be used to determine touch location 160 along the y-axis.

In some cases, the controller can apply a voltage signal, such as an AC voltage, to the four corners, where in some cases, the same voltage signal may be applied to the four corners. In such cases, the controller can detect the current at each of the four corners, namely $I_{132A}$, $I_{132B}$, $I_{132C}$, and $I_{132D}$. In general, the controller can apply signals (for example, current, voltage, charge, etc.) to the four corners and detect a parameter of the signal (for example, current or voltage magnitude, frequency or phase of current or voltage, quantity of charge, rate of change of charge, etc.) at the four corners.

In general, an electrode in the plurality of tapered electrodes 120 can have any shape that allows determination of a touch location of a touch implement along the x-direction by comparing the capacitive coupling between the touch implement and the four corner positions 132A-132D, and allows determination of the touch location along the y-direction by comparing the resistive coupling between the touch implement and the four corner positions 132A-132D on the touch panel.

Figure 3:
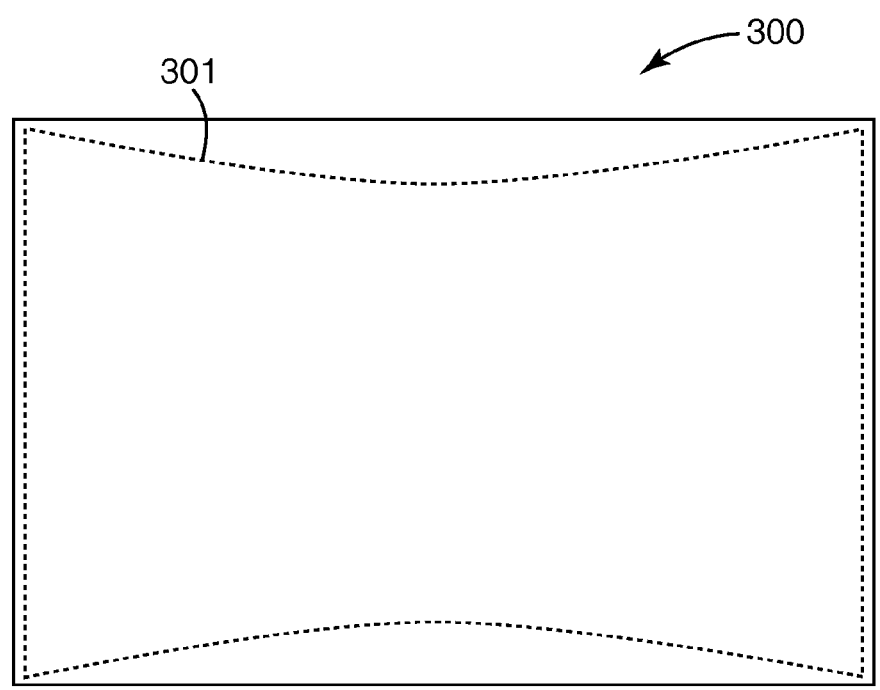
FIG. 3 schematically illustrates the effects of electric field bowing on a capacitive touch sensor.

FIG. 3 shows a solid line 300 indicating the coordinates that would ideally be detected if a finger were traced in a rectangle around the outer edge of the active area of a sensor of the present disclosure such as sensor 110 in FIG. 1. Dashed line 301 schematically indicates the distortion caused by "bowing" that affects the actual coordinates that are detected and reported if no correction scheme is employed. The curved nonlinearity at the top and bottom edges of line 301 is due to the attenuating effects of resistive divider bars such as 130 and 131 in FIG. 1.

Referring to FIG. 1, touch sensor 110 can additionally include optional bars 140 and 141, one of which can run along an edge adjacent to the bases of the top electrodes and one of which can run along an edge adjacent to the bases of the bottom electrodes. While FIG. 1 shows bars 140 and 141 to lie within the active touch area 115, they can also lie outside of the active touch area. Bars 140 and 141 can fulfill several purposes, including shielding from unwanted external capacitive coupling, or to enhance the detection of touch inputs near the top and bottom edges of the touch sensor where resolution can be lost due to minimal capacitive coupling with the tips of the tapered electrodes.

On sensors with unshielded interconnecting lines around the periphery of a touch area, edge bars such as bars 140 and 141 in FIG. 1 can be used to improve edge accuracy by indicating proximity to an edge. By knowing the proximity of a touch input to the edge from the edge bar information, errors caused by capacitive contact with interconnection lines can be corrected. Various types of edge bars can be employed. For example, one type of edge bar connects to separate I/O lines and therefore can be measured separately from the touch electrodes in the main active area. Bars 140 and 141 as shown in FIG. 1 are of this type. In a second type, the edge bars connect to the I/O lines of the main electrode array, and signals of the edge bars are combined with those of the main electrode array (see, for example, FIG. 7 and accompanying discussions).

Edge bars such as bars 140 and 141 are preferably constructed of a transparent conductive material such as ITO (particularly when disposed in a visible display area), or can be a conductive printed material such as carbon or silver. In FIG. 1, the bars 140 and 141 are connected to a fifth (optional) I/O 132E, which can be driven with the same AC signal as I/O's 132A-132D. The current flowing through 132E may also be measured, and thus changes in the current in edge bars 140 and/or 141 due to proximity of a finger or other touch implement may be monitored. Edge bars 140 and 141 can be used to define the edge of the active area, whereby an increase in current in 132E indicates a touch input has reached the edge of the active area. A refinement in the touch position, particularly near edges, can be obtained by calculating the proportion of current flowing through 132E versus the currents flowing through the upper connections 132A and 132D and/or the lower connections 132B and 132C, and then using known calibration methods to correct errors. For example, if currents in 132B and/or 132C are greater than currents in 132A and 132D, a touch is located nearer to the lower portion of the sensor. If, in addition, the current in 132E rises, it may be inferred that the touch is approaching bar 141. Calibration using the current in 132E and the currents in 132B and 132C may be used to resolve the location of a touch to greater accuracy than is possible using ratios of currents in 132A-132D alone.

In addition to providing more accuracy in touch position near the edges of the sensor, edge bars can be used to reduce errors due to direct coupling of touch inputs to the interconnect lines, particularly in sensors that lack sufficient shielding. Touch sensors include an active area within which touch inputs are intended and touch input positions can be accurately measured. The signal interconnect lines are typically outside the active area and are preferably shielded from touch inputs by a grounded or a driven shield. A touch input that contacts, or capacitively couples to, sensor electrodes and an interconnect line will produce an error in measured touch location because the coupling with the interconnect line will cause currents to flow in the signal line connections that are not proportional to position. If a shield is not present, edge bars can be used to provide a measurable indication that a touch is approaching the interconnect lines. For example, referred back to FIG. 1, if the signal measured at 132E has a magnitude that is close to, or even larger than, the sum of the signals at 132A/132D or 132B/132C, then the touch may not be in the active area. This would indicate that excessive touch coupling with the interconnect lines may be present, and touch measurements may not be accurate.

Errors due to excessive touch coupling with the interconnect lines and errors due to "bowing" distortion (see FIG. 3) may be compensated by using signals from edge bars in combination with corner signals. For example, a signal measured at 132E may be used in combination with signals at 132A/132D or 132B/132C to correct for errors. Empirical error correction algorithms may be used, based on calibration of touch sensor 110 at multiple points prior to use. Known calibration methods include a 25-point factory calibration process and algorithm used in current 3M touch products.

Electrodes 120 can be optically opaque, or partially or substantially transmissive of visible light. Electrodes 120 can be a metal, semiconductor, doped semiconductor, semimetal, metal oxide, an organic conductor, a conductive polymer, and the like. Exemplary metal conductors include gold, copper, silver, and the like. Exemplary inorganic materials include transparent conductive oxides, for example indium tin oxide (ITO), fluorine doped tin oxide, tin antimony oxide (TAO), and the like. Exemplary organic materials include conductive polymers such as polypyrrole, polyaniline, polyacetylene, and polythiophene, such as those disclosed in European Patent Publication EP-1-172-831-A2. The sheet resistance of electrodes 120 can be in a range from about 100 to 10,000 Ohms/square. In some cases, the sheet resistance of electrodes 120 can be in a range from about 10 to 10,000 Ohms/square. In some other cases, the sheet resistance of electrodes 120 can be in a range from about 10 to 5,000 Ohms/Square. In some other cases, the sheet resistance of electrodes 120 can be in a range from about 10 to 2,000 Ohms/Square.

Substrate 110 can be glass, plastic, or any other suitable sensor substrate. In addition, the substrate can be a functioning device such as an electronic display, a privacy filter, a polarizer, and so forth.

Figure 4:
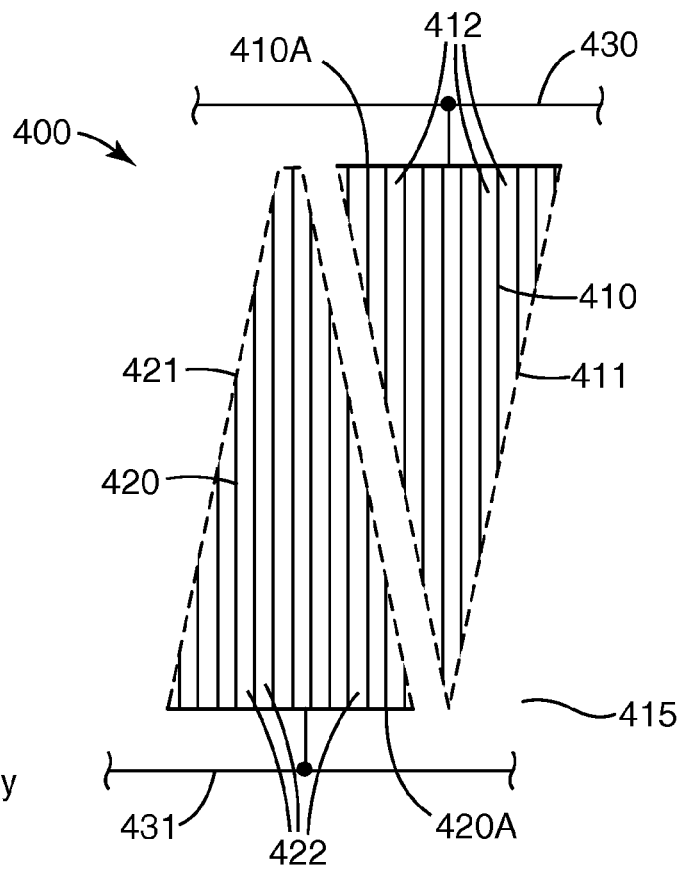
FIG. 4 schematically shows an arrangement of tapered electrodes useful in sensors according to the present disclosure.

An electrode in the plurality of tapered electrodes 120 can be a continuous electrically resistive film such as electrodes 120 shown in FIG. 1. In some cases, an electrode in the plurality of tapered electrodes 120 can be non-continuous, for example by including a comb-like array of electrode lines electrically connected to each other. For example, FIG. 4 shows a schematic portion of a touch sensor that includes top comb-like electrode 410 and bottom comb-like electrode 420. Each electrode includes an array of parallel electrode lines enclosed by the electrode envelope. For example, triangular top electrode 410 has an array of parallel electrode lines 412 confined within an electrode envelope 411 where electrode lines 412 are electrically connected to one another via conductive base 410A. As another example, trapezoidal bottom electrode 420 has an array of parallel electrode lines 422 confined within an electrode envelope 421 where electrode lines 422 are electrically connected to one another via conductive base 420A. In the exemplary touch sensor shown in FIG. 4, parallel electrode lines 412 and 422 are parallel to each other. In general, parallel electrode lines 412 may or may not be parallel with parallel electrode lines 422. Furthermore, although each array of parallel lines in FIG. 4 extend along the x-axis, in general, each array of parallel line can be oriented along any direction that may be desirable in an application.

Figure 5:
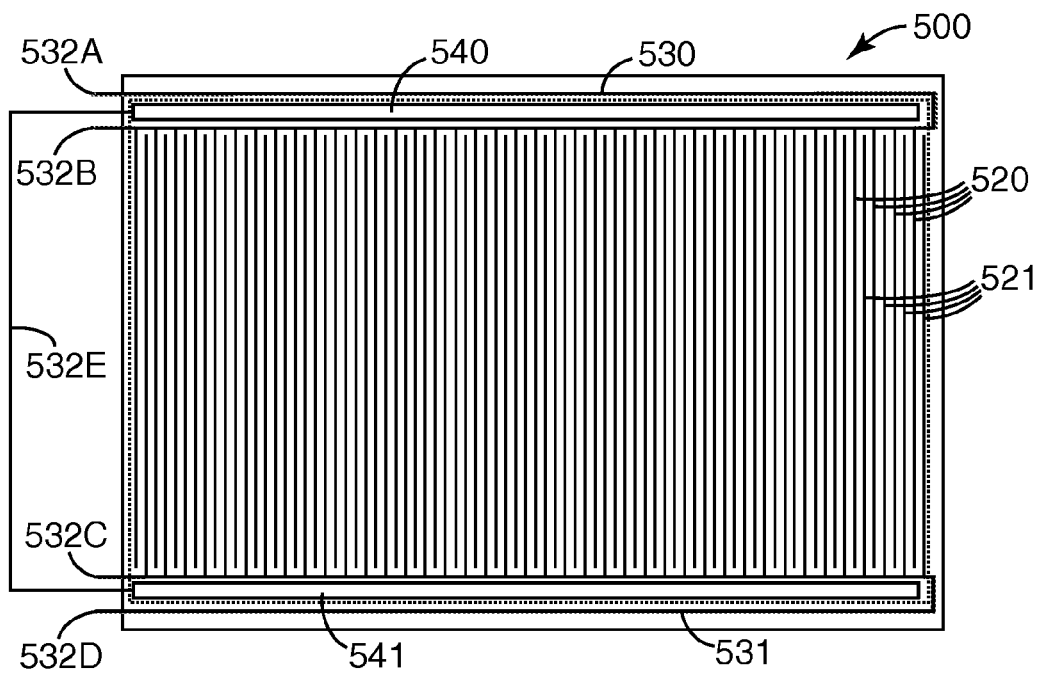
FIG. 5 is a schematic top view of a sensor according to the present disclosure.

FIG. 5 shows a sensor 500 that is similar to the sensor 110, except that the tapered electrodes are replaced by sets of straight, resistive electrodes 520 and 521. Electrodes 520 are connected to line 530 at the top of the sensor, and electrodes 521 are connected to line 531 at the bottom of the sensor. Each of electrodes 520 and 521 has an end-to-end resistance that is preferably in the range of about 1 KΩ to 1 MΩ. Interconnect lines 530 and 531, I/O's 532A-532D, and optional edge electrodes 540 and 541 have the same functions as described previously. Sensor 500 differs from sensor 110 mainly in the method of dividing touch signals in the vertical dimension (the direction of the resistive sensor electrodes). Sensor 110 from FIG. 1 divides touch capacitance between the upper and lower interconnects by virtue of the proportional areas of the tapered electrodes (upper wedges versus lower wedges) that are coupled by a touch within active area. Sensor 500 divides touch signals between lines 530 and 531 by virtue of R-C attenuation of touch signals due to end-to-end resistance of upper sensor lines 520 and lower sensor lines 521, and due to the parasitic capacitance of lines 520 and 521. Each electrode 520 and 521 has sufficient resistance and parasitic capacitance to cause significant attenuation of the measured signals at the open end of the electrode relative to the end that is connected to its respective interconnect line 530 or 531. Identical AC voltages can be applied to connections 532A-532D, and the ratios of currents into the four connections can be used to calculate position on the sensor, as described above. To locate the touch in the vertical dimension, the ratios of currents are determined by attenuation of touch signals due to R-C losses, and to locate the touch in the horizontal dimension, the current ratios are determined by ratios of resistances along resistive bars 530 and 531.

The degree of attenuation along the length of electrodes 520 and 521 of sensor 500 will depend on parameters including the end-to-end resistance of each electrode and the distributed parasitic capacitance of each electrode. These parameters may vary among different sensor designs, so calibration may be used to achieve consistent position measurement. Alternatively or in addition to calibration, frequency of operation may be adjusted to achieve desired attenuation curves. For example, attenuation curves that provide a high degree of variation over the range of vertical touch positions can yield good measurement resolution. A frequency of operation that is too low can lead to less R-C attenuation across the length of an electrode, resulting in a narrower range of signal and perhaps a loss of resolution. A frequency of operation that is too high can cause too much attenuation, which can also result in a loss of resolution. Accordingly, the frequency of operation can be adjusted to provide desirable response. For example, one way to adjust frequency of operation may be:

1. operate the controller at a selected frequency;
2. measure signals at the four interconnects due to sample touch inputs near each of the four corners of the sensor (e.g., 10% inward from each corner); and
3. adjust operating frequency so that the difference between the largest signal and the smallest signal of each measurement is sufficiently large to yield the required resolution, for example a touch near the upper left corner may preferably yield an upper left interconnect current that is within a range of desired maximum measurement signal, and a lower right interconnect signal that is about 10% of the maximum signal.

The term "frequency of operation" is straightforward when using controllers that operate as a single frequency, such as the EXII controllers available from 3M Touch Systems, Inc. "Frequency of operation" also applies to charge-discharge based controllers such as the SMT3 controller available from 3M Touch Systems, Inc., or those disclosed in co-assigned U.S. patent application Ser. No. 11/612,790 entitled "Capacitance Measuring Circuit and Method," where operating frequency refers to the inverse of the period of a charge-discharge pulse.

Referring again to FIG. 5, optional edge bars 540 and 541 can be used. The signal at connection 532E can be used to indicate that a touch is near the upper edge or lower edge of the active area of the sensor. This information can be helpful because the ratios of the signals at 532A-532D are typically less linear near the upper and lower edges. It can thus be helpful to have a separate indicator of edge proximity. The signal from 532E can be used as a correction factor in position calculations, yielding a higher resolution indicator of edge proximity. While it is possible to shield interconnect lines 530 and 531 to reduce direct coupling from a touch near the edges, the use of bars 540 and 541 can provide sufficient compensation so that shielding is not necessary.

Figure 6:
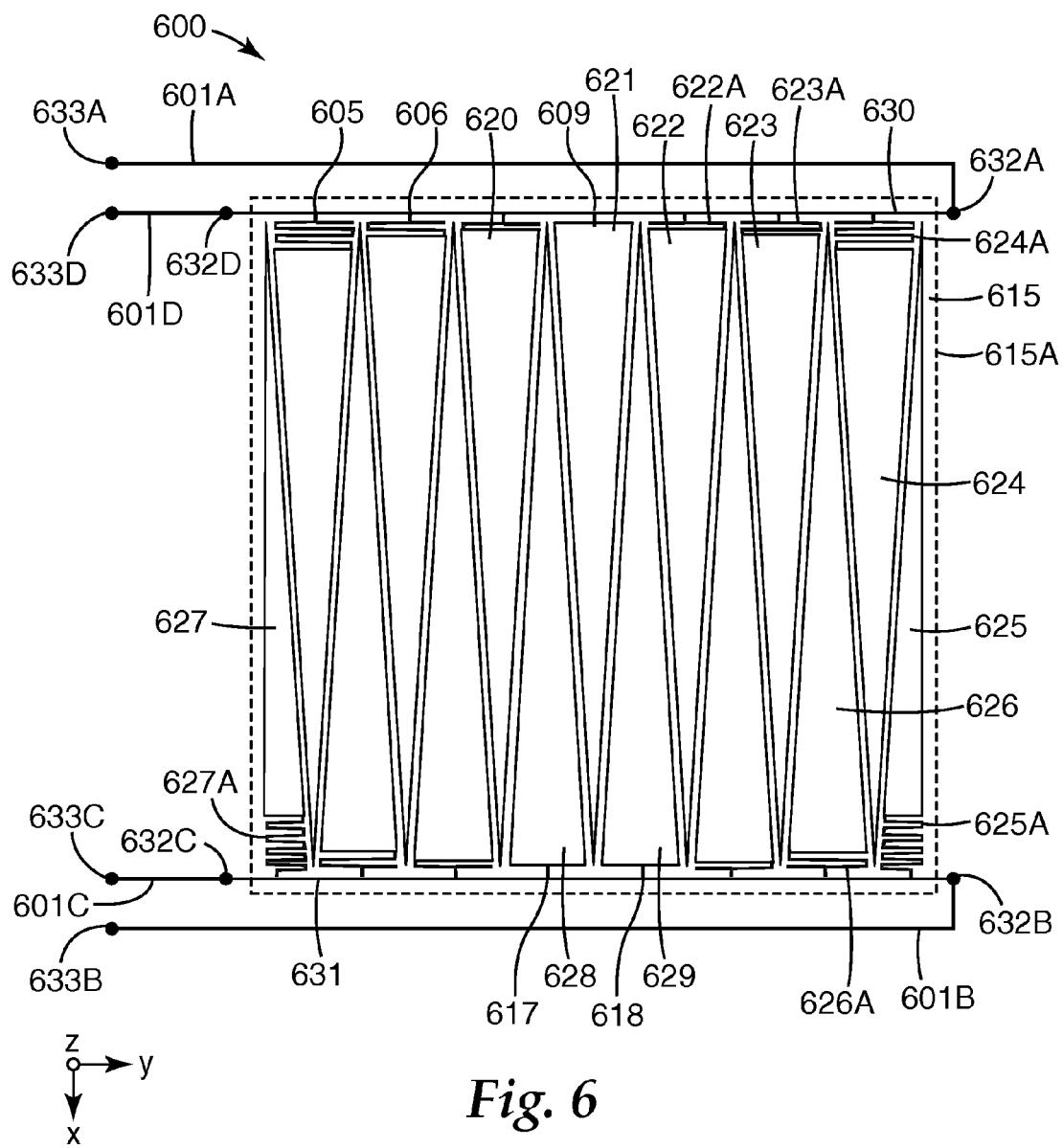
FIG. 6 schematically shows an arrangement of tapered electrodes useful in sensors according to the present disclosure.

FIG. 6 shows a schematic view of a touch sensor 600 that includes a plurality of tapered electrodes 620 disposed in touch sensitive area 615 having perimeter 615A. Electrodes 620 include one or more middle tapered electrodes, such as middle electrodes 621 and 626, disposed between two edge electrodes 627 on the left and 625 on the right, respectively. Each tapered electrode has a triangular shape. Some of the triangular electrodes include resistor elements electrically connected to the base of the electrode. For example, top middle electrode 622 includes resistor 622A, top middle electrode 623 includes resistor 623A, bottom middle electrode 626 includes resistor 626A, and edge electrodes 625 and 627 include resistors 625A and 627A, respectively. Given resistor elements of minimum size relative to touch area 615, the resistor elements do not significantly affect touch sensor linearity in the y-direction, but can substantially improve linearity along the x-axis. Bowing nonlinearities such as seen in FIG. 3 can be reduced by the addition of the resistors shown in touch sensor 600.

The top triangular electrodes are connected to resistive divider bar 630 that terminates at corner point 632D on the left and corner point 632A on the right. Similarly, the bottom triangular electrodes are connected to resistive divider bar 631 that terminates at corner point 632C on the left and corner point 632B on the right.

Four corners 632A-632D are electrically extended to I/O connections 633A-633D using interconnect lines 601A-601D, respectively. Each interconnect line has a resistance that is substantially smaller than the resistive divider bar it is connected to. For example, the resistance of interconnect line 601A is substantially smaller than the resistance of resistive divider bar 630. As another example, the resistance of interconnect line 601B is substantially smaller than the end-to-end resistance of resistive divider bar 631. The end-to-end resistance of an interconnect line can be less than 500 ohms. In some cases, the end-to-end resistance of an interconnect line can be less than 100 ohms. In some other cases, the end-to-end resistance of an interconnect line can be less than 50 ohms. In some other cases, the end-to-end resistance of an interconnect line can be less than 1 ohm.

In some cases, the end-to-end resistance of a resistive divider bar may be expressed in terms of the resistance between adjacent top or bottom electrodes. For example, in the exemplary touch sensor of FIG. 6, resistive divider bar 630 is divided into eight equal segments between corners 632D and 632A. Each segment has resistance R. In some cases, the resistor elements in the top electrodes are chosen so that each of the top electrodes has essentially the same resistance to I/O connections 633A and 633D. Similarly, the resistor elements in the bottom electrodes are chosen so that the bottom electrodes have essentially the same resistance to I/O connections 633C and 633B.

In the exemplary touch sensor 600, the resistance between middle electrode 621 and I/O connections 633A and 633D is essentially the resistance between points 609 and 632D in parallel with the resistance between points 609 and 632A. Given that points 633A-633D are connected to ground via low impedance circuits, electrode 621 has a resistance to I/O connections 633A and 633D of 2R (4R in parallel with 4R). In the absence of resistor element 622A, the resistance to ground of electrode 622 is essentially 5R parallel with 3R which is 15R/8. Therefore, a resistor element 622A of R/8 (2R-15R/8) results in electrode 622 having the same resistance to ground as electrode 621. Similarly, in the absence of resistor element 623A, the resistance to ground of electrode 623 is 6R parallel with 2R which is 3R/2. Therefore, a resistor element 623A of R/2 results in electrode 623 having the same resistance to ground as electrode 621.

Regarding the bottom electrodes, each of bottom middles electrodes 628 and 629 has a resistance to ground equal to essentially 4R' parallel with 5R' which is 20R'/9. In the absence of resistor element 626A, bottom middle electrode 626 has a resistance to I/O connections 633B and 633C equal to 2R' parallel with 7R' which is 14R'/9. Therefore, a resistor element 626A of 2R'/3 results in electrode 626 having the same resistance to I/O connections as electrodes 628 and 629. Similarly, in the absence of resistor element 625A, bottom edge electrode 625 has a resistance to I/O connections equal to essentially R' parallel with 8R' which is 8R'/9. Therefore, a resistor element 625A of 4R'/3 results in electrode 625 having the same resistance to I/O connections as electrodes 628 and 629.

The resistor elements, such as resistor elements 622A and 625A, may be discrete resistors attached to individual triangular electrodes as needed. In some cases, the resistor elements may be integrated into active area 615. For example, the resistor elements may be formed in active area 615 using a resistive material such as, for example, ITO. In the exemplary touch sensor 600, the resistor elements are resistive lines, such as resistive ITO lines, attached to the bases of the electrodes. Furthermore, to reduce the area occupied by each resistor element, the resistor elements are patterned as squarewaves, confined within the triangular shape of each electrode.

The resistor elements can also protect touch sensor 600 from electrostatic discharge (ESD) between an object and the touch sensor by reducing flow of currents generated by the ESD to touch sensor controller and electronics (not explicitly shown in FIG. 6).

The resistor elements can also reduce electromagnetic interference (EMI) that would be generated in touch sensitive area 615 by signals applied to I/O connections 633A-633D, and thus to electrodes 620.

Figure 7:
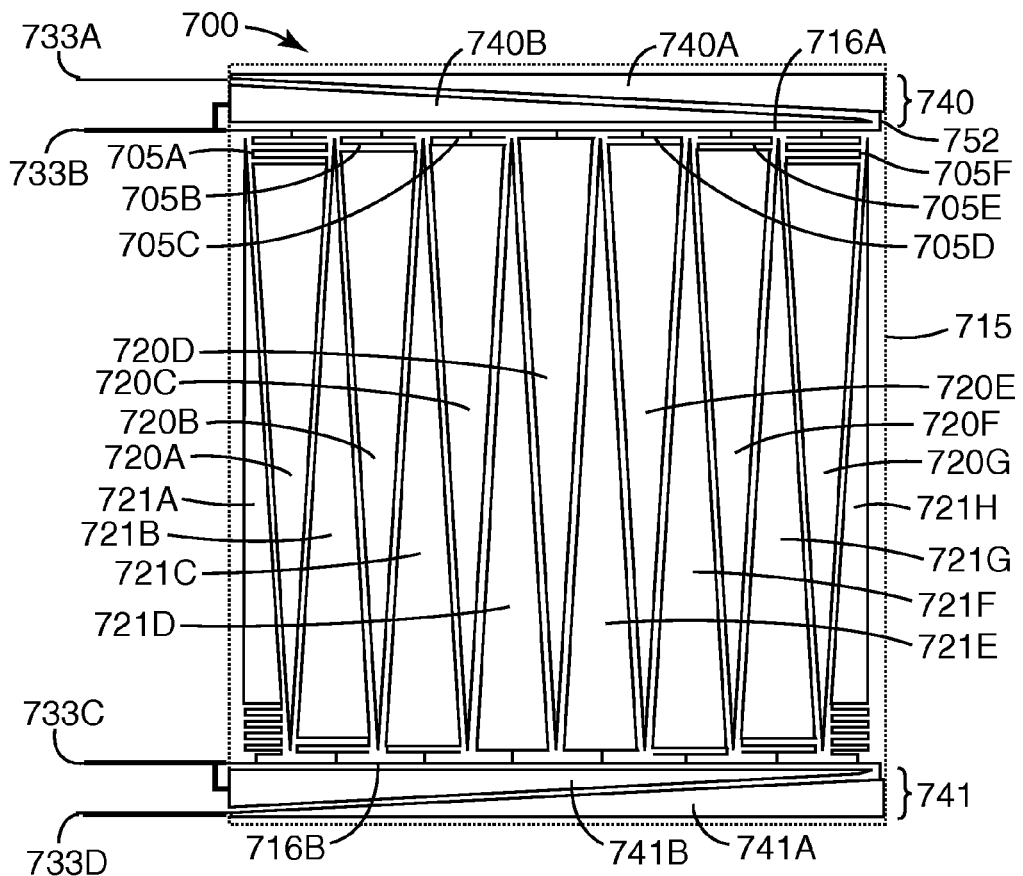
FIG. 7 schematically shows an arrangement of tapered electrodes useful in sensors according to the present disclosure.

FIG. 7 shows an alternative construction in which the tapered electrodes 740A/740B and 741A/741B have been added in a direction orthogonal to electrodes 720A-720G and 721A-721H. Electrodes 740A/740B and 741A/741B are electrically connected to I/O connections 733A-733D. Electrode 740A is also connected to one end of resistive line 716A, and 741A is connected to one end of resistive line 716B. Thus, 740A serves the function of electrically connecting line 716A to I/O connection 733A, and 741A connects an end of line 716B to I/O connection 733D. In addition, electrodes 740A and 740B are touch sensitive, and located within touch active area 715. Electrodes 740A and 740B are driven by signals applied to I/O connections 733A and 733B, and they provide a horizontal touch signal divider function that is proportional to the ratio of touch area on each of the electrodes 740A and 740B, similar to the way the tapered electrodes 720A-720G and 721A-721H divide touch signals vertically. The combination of electrodes 740A and 740B can be considered as a single bar 740 whose width is preferably less than half of a minimum touch width (about 6 mm for a finger touch). Electrodes 741A and 741B perform the same function to the bottom edge as electrodes 740A and 740B do for the top edge. In some cases, electrodes 740B and 741B may be omitted with a minor reduction in accuracy.

Electrodes 740A/740B and 741A/741B, combined with tapered electrodes 720A-720G and 721A-721H, and divider bars 716A and 716B and, optionally, resistors such as 705A-705F, provide a touch surface with a high degree of touch sensitivity and linearized edge transitions across the surface and near all four edges. All the elements within active area 715 can be made transparent, for example made of conductive ITO on glass or PET, so that the entire active area can be used to view a display.

Figure 8:
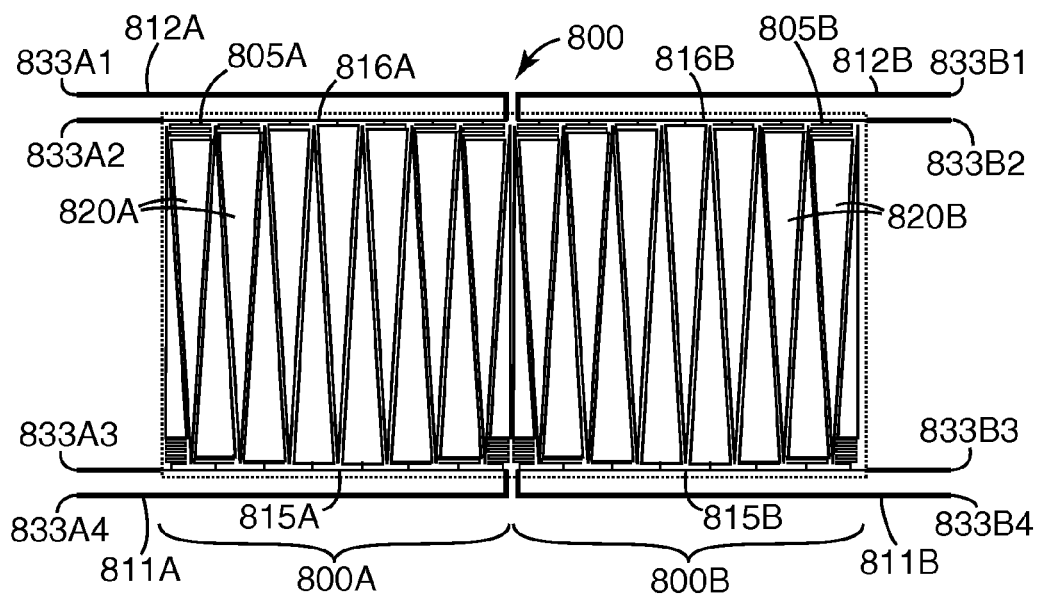
FIG. 8 schematically shows an arrangement of tapered electrodes useful in sensors according to the present disclosure.

The active touch area 715 of sensor 700 may extend to the edge of the sensor, requiring virtually no border area for linearization components and/or interconnections. This allows seamless joining of multiple sensors. For example, FIG. 8 shows two sensors 800A and 800B, each similar to sensor 700 from FIG. 7, which are placed closely adjacent to form a continuous touch area. Sensors 800A and 800B may be formed on the same substrate or on separate substrates and then joined. If sensors 800A and 800B are transparent, the edge where they join together can also be made transparent and substantially invisible. Simultaneous touch locations may be measured independently on the two sensors, provided one touch is on sensor 800A and the other touch is on sensor 800B. In addition, the fully independent measurements from sensors 800A and 800B can be used to help discriminate between an intended finger touch and the contribution from another finger or palm of a hand that may be unintended and may otherwise undesirably perturb the position location of the intended touch input.

Sensors 800A and 800B may also be joined electrically by connecting I/O connection 833A4 to I/O connection 833B4, and I/O connection 833A1 to I/O connection 833B1. The resulting combined sensor 800 can measure two simultaneous touches, at least to a limited degree, providing the touches are relatively far from the common I/O connections. For example, on sensor 800A a touch near the left edge and a touch near the right edge can be discriminated, whereas two touches near the intra-sensor connections (e.g., near the upper right and lower right corners of sensor 800A) might not be readily discriminated. Even so, it may be desired to configure the sensors with such intra-sensor connections to realize advantages of using 6 I/O connections rather than 8.

Figure 9:
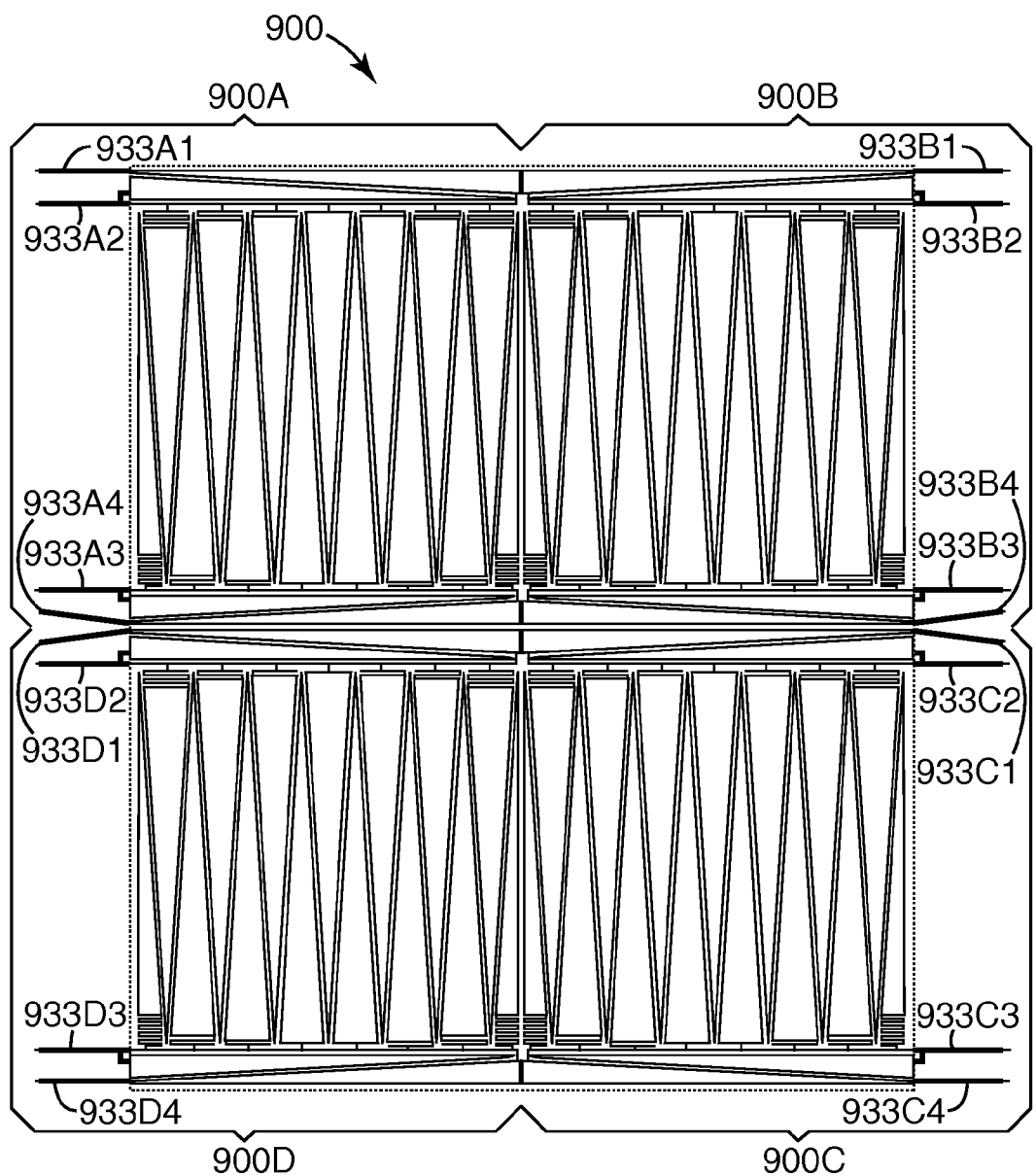
FIG. 9 schematically shows an arrangement of tapered electrodes useful in sensors according to the present disclosure.

FIG. 9 shows a combined sensor 900 with four sub-sensors 900A-900D and 16 I/O connections 933A1-933A4, 933B1-933B4, 933C1-933C4, and 933D1-933D4. Each of the four sub-sensors is similar to sensor 700 shown in FIG. 7. This configuration may be used to independently measure up to four touch capacitances, one in each of the four sub-sensor areas. A combined sensor with four partially independent sub-sensor quadrants may be made with eight I/O connections by shorting together 933A1 with 933B1, 933B3 with 933C2; 933B4 with 933C1, 933C4 with 933D4, 933D3 with 933C3; 933A3 with 933D2, and 933A4 with 933D1.

By extension, using the sensor combination concepts shown and described with respect to FIGS. 8 and 9, any number of sensors can be combined as desired, for example to increase the number of independently measurable simultaneous touch inputs, albeit at the expense of additional I/O connections, which of course can be reduces by connecting together individual I/O connections of the various sub-sensor units.

Figure 10:
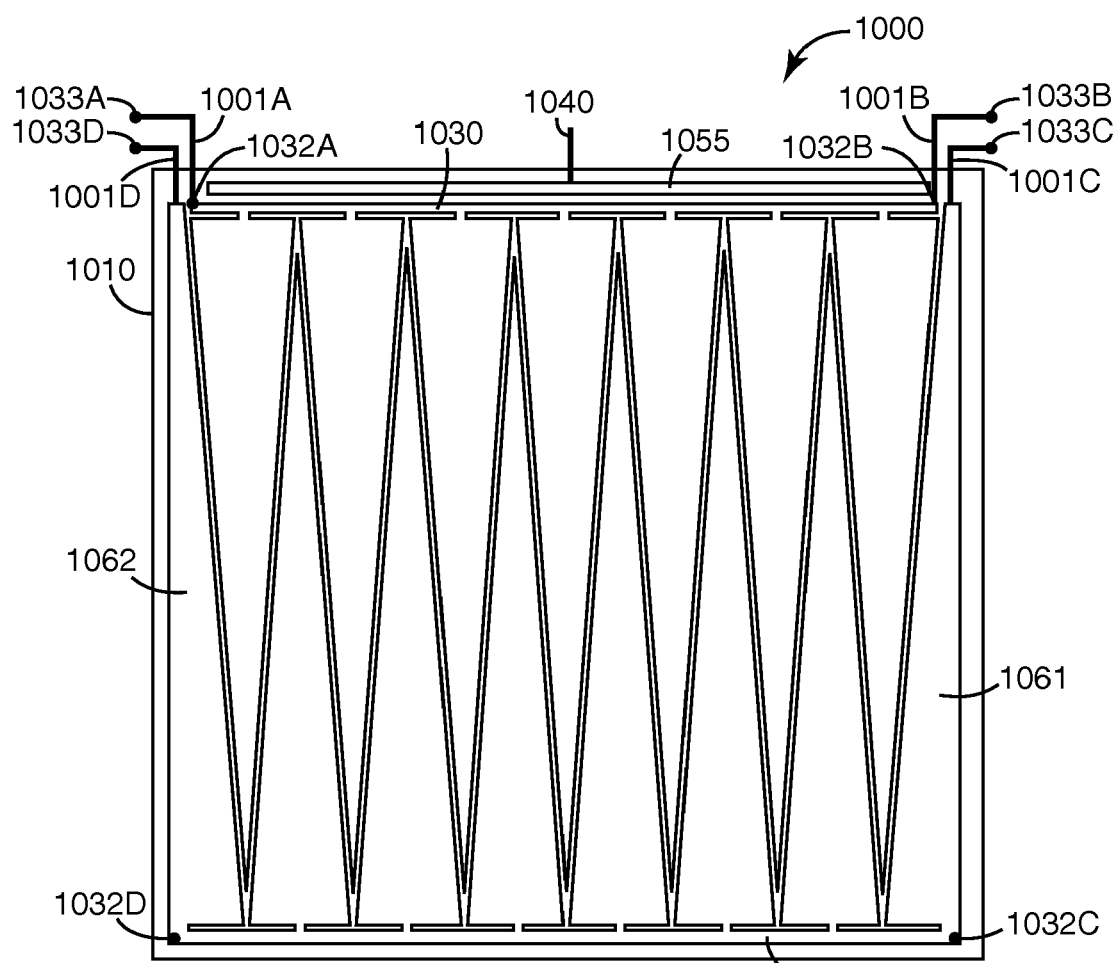
FIG. 10 schematically shows an arrangement of tapered electrodes useful in sensors according to the present disclosure.

FIG. 10 shows a sensor 1010 having an alternative construction whereby electrodes 1061 and 1062 are used to interconnect corners 1032C and 1032D with I/O connections 1033C and 1033D respectively. Corner 1032C is connected to I/O connection 1033C via electrode 1061 and interconnect line 1001C. Corner 1032D is connected to I/O connection 1033D via electrode 1062 and interconnect line 1001D.

If end-to-end resistance of electrodes 1061 and 1062 is too large, conductive interconnect lines 1001C and 1001D may be extended across electrodes 1061 and 1062 to corners 1031C and 1032D respectively. In this case, interconnect line 1001C could be placed at or near the right edge of electrode 1061 and interconnect line 1001CD could be placed at or near the left edge of electrode 1062.

Sensor 1010 of FIG. 10 has a significant benefits due to the interconnects being integrated into the electrodes. For example, a touch near the left or right edge of does not cause errors due to touch coupling to interconnect lines running parallel to the edges of the sensor active area, as can be caused by touches near the interconnect lines in the sensor depicted in FIG. 1). This allows sensors to be constructed without shielding the interconnect lines, and it allows multiple sensors to be tiled together as shown in FIGS. 8 and 9. Also, a single compensating edge bar 1055 can be used to compensate for errors due to touches near interconnect lines 1001A, 1001B, 1001C, and 1001D.

Figure 11:
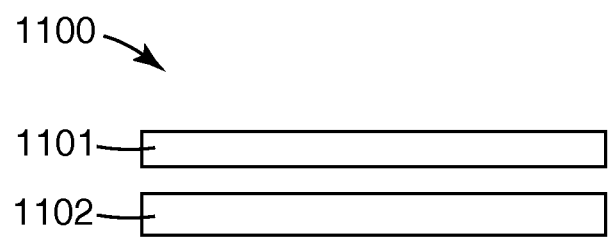
FIG. 11 is a block diagram of a touch sensor system that can utilize sensors according to the present disclosure.

FIG. 11 illustrates a schematic cross-section of a display system 1100 that includes a touch sensor 1101 and a display 1102. Display 1102 can be viewable through touch sensor 1101. Touch sensor 1101 can be any touch sensor described in the present disclosure. Display 1102 can include permanent or replaceable graphics (for example, pictures, maps, icons, and the like) as well as electronic displays such as liquid crystal displays (LCD), cathode ray tubes (CRT), plasma displays, electroluminescent displays, OLEDs, electrophoretic displays, and the like. It will be appreciated that although in FIG. 11 display 1102 and touch sensor 1101 are shown as two separate components, the two can be integrated into a single unit. For example, touch sensor 1101 can be laminated to display 1102. Alternatively, touch sensor 1101 can be an integral part of display 1102.

As used herein, terms such as "vertical", "horizontal", "above", "below", "top", "bottom", "left" and "right", and other similar terms, refer to relative positions as shown in the figures. In general, a physical embodiment can have a different orientation, and in that case the terms are intended to refer to relative positions modified to the actual orientation of the device. For example, even if the construction in FIG. 1 is inverted as compared to the orientation in the figure, electrode 121 is still considered to be a "top" electrode and electrode 122 is still considered to be a "bottom" electrode. The term "corner" may refer to the corner of an electrode array. For example, sensor 600 shown in FIG. 6 has four corners, and sensor 900 shown in FIG. 9 has 16 array corners.

Although the present invention has been described with reference to preferred embodiments, workers skilled in the art will recognize that changes may be made in form and detail without departing from the spirit and scope of the invention.

What is claimed is:

1. A capacitive touch sensor comprising a plurality of discrete elongated electrically resistive electrodes disposed in a touch sensitive area, each discrete electrode having a length along a first direction and a width along a second direction orthogonal to the first direction, the width of each elongated electrode varying along the first direction, wherein when a touch implement is applied to a touch location in the touch sensitive area, the touch location is determined by simultaneously applying an electrical signal to a plurality of positions on the touch sensor, the touch location along the first direction being determined by comparing a capacitive coupling between the touch implement and the plurality of positions in the touch sensor, and the touch location along the second direction being determined by comparing a resistive coupling between the touch implement and the plurality of positions in the touch sensor.

2. The capacitive touch sensor of claim 1, wherein the width of each elongated electrode varies linearly along the length of the electrode.

3. The capacitive touch sensor of claim 1, wherein at least one elongated electrode has a wedge shape.

4. The capacitive touch sensor of claim 1, wherein each elongated electrode has a triangular shape with two sides connecting a tip to a base.

5. The capacitive touch sensor of claim 4, wherein a first plurality of bases are arranged along a first linear sequence and a second plurality of bases are arranged along a second linear sequence.

6. The capacitive touch sensor of claim 5, wherein each of the first and second linear sequences includes a plurality of tips from the plurality of elongated triangular electrodes.

7. The capacitive touch sensor of claim 5, further comprising first and second electrically resistive edge bars disposed to have lengths that extend along the first and second linear sequences of bases, respectively.

8. The capacitive touch sensor of claim 7, wherein each of the first and second resistive edge bars comprises two discrete tapered segments, the two segments being arranged to taper oppositely along the length of the edge bar.

9. The capacitive touch sensor of claim 7, wherein the first and second edge bars are not resistively connected to the plurality of discrete elongated electrodes.

10. The capacitive touch sensor of claim 7, wherein the first edge bar is electrically connected to the second edge bar.

11. The capacitive touch sensor of claim 7, wherein the first and second edge bars are in the touch sensitive area.

12. The capacitive touch sensor of claim 7, wherein signals are applied to the edge bars to that capacitive coupling of a touch input to the edge bars can be determined.

13. The capacitive touch sensor of claim 12, wherein the degree of capacitive coupling of a touch input to the edge bars is used to correct errors in touch position determination.

14. The capacitive touch sensor of claim 5, wherein the first plurality of bases are electrically connected to a first subset of the plurality of positions in the touch sensor, and the second plurality of bases are electrically connected to a second subset of the plurality of positions in the touch sensor.

15. The capacitive touch sensor of claim 1, wherein the plurality of electrodes includes a first electrode located at one end of the touch sensitive area along the second direction, a last electrode located at an opposing end of the touch sensitive area along the second direction, and middle electrodes located between the first and last electrodes, and further wherein the first and last electrodes each cover a smaller area than any of the middle electrodes.

16. The capacitive touch sensor of claim 1, wherein a wider width of a first elongated electrode is adjacent to a narrower width of a second elongated electrode, and wherein a narrower width of the first elongated electrode is adjacent to a wider width of the second elongated electrode.

17. The capacitive touch sensor of claim 1, wherein a spacing between at least two elongated electrodes is substantially a constant along the first direction.

18. The capacitive touch sensor of claim 1, wherein the plurality of positions in the touch sensor are along a periphery of the touch sensitive area.

19. A capacitive touch sensor comprising a plurality of discrete electrodes disposed in a touch sensitive area, each discrete electrode having a length along a first direction and a width along a second direction, the width of each electrode varying along the first direction, wherein a touch location of a touch implement is determined for the first direction when a plurality of positions along a periphery of the touch sensitive area are electrically energized, wherein a ratio of a capacitive coupling between the touch implement and a first pair of positions in the plurality of positions changes when the touch location is changed along the first direction but the ratio remains essentially unchanged when the touch location is changed along the second direction, and wherein a ratio of a resistive coupling between the touch implement and the first pair at positions in the plurality of positions changes when the touch location is changed along the second direction but the ratio remains essentially unchanged when the touch location is changed along the first direction.

20. A capacitive, touch sensor comprising at least one sensor array, the sensor array comprising:
a first plurality of triangular electrodes interdigitated with a second plurality of triangular electrodes, the electrodes in the first and second plurality being elongated and having a length in a first direction and a width in a second direction orthogonal to the first direction, the width of each triangular electrode varying along the first direction, and disposed in a touch sensitive area such that a side of each triangular electrode faces and is substantially parallel to a side of an adjacent triangular electrode; and
a third plurality of triangular electrodes oriented orthogonally to the first direction and electrically connected to the first plurality of triangular electrodes through a first resistive divider,
wherein when a touch implement is applied to a touch location in the touch sensitive area, the touch location is determined by electrically energizing both ends of the first resistive divider and comparing signals generated by capacitive and resistive coupling between the touch implement and the first and second resistive dividers, wherein the signals generated by capacitive coupling determine the touch location along the first direction, and the signals generated by the resistive coupling determine the touch location along the second direction.

21. The capacitive touch sensor of claim 20, further comprising a fourth plurality of triangular electrodes oriented orthogonally to the first direction and electrically connected to the second plurality of triangular electrodes through a second resistive divider.

22. The capacitive touch sensor of claim 20, wherein the at least one sensor array comprises four sensor arrays tiled together so that each sensor array has two edges adjacent to other sensor arrays.

* * * * *

UNITED STATES PATENT AND TRADEMARK OFFICE
CERTIFICATE OF CORRECTION

| | | |
|---|---|---|
| PATENT NO. | : 7,973,771 B2 | Page 1 of 1 |
| APPLICATION NO. | : 11/734553 | |
| DATED | : July 5, 2011 | |
| INVENTOR(S) | : Bernard Geaghan | |

It is certified that error appears in the above-identified patent and that said Letters Patent is hereby corrected as shown below:

Column 16

Line 26, Claim 19, delete "pair at" and insert -- part of -- therefor.

Line 30, Claim 20, delete "capacitive," and insert -- capacitive -- therefor.

Signed and Sealed this

Twenty-fifth Day of October, 2011

David J. Kappos
*Director of the United States Patent and Trademark Office*